United States Patent
Lee et al.

(10) Patent No.: US 9,128,555 B2
(45) Date of Patent: Sep. 8, 2015

(54) MULTI-DISPLAY DEVICE AND METHOD FOR CONTROLLING THE SAME

(75) Inventors: Chang Dae Lee, Seoul (KR); Seung Heon Jeon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 709 days.

(21) Appl. No.: 12/861,481

(22) Filed: Aug. 23, 2010

(65) Prior Publication Data

US 2011/0187655 A1    Aug. 4, 2011

(30) Foreign Application Priority Data

Jan. 29, 2010  (KR) .................. 10-2010-0008671

(51) Int. Cl.
*G06F 3/041*  (2006.01)
*G06F 1/16*  (2006.01)
*G06F 3/0488*  (2013.01)

(52) U.S. Cl.
CPC ............ *G06F 3/0412* (2013.01); *G06F 1/1641* (2013.01); *G06F 1/1643* (2013.01); *G06F 1/1647* (2013.01); *G06F 1/1652* (2013.01); *G06F 3/041* (2013.01); *G06F 3/0488* (2013.01)

(58) Field of Classification Search
USPC ................................. 345/4–6, 173
See application file for complete search history.

(56) References Cited

U.S. PATENT DOCUMENTS

| | | | |
|---|---|---|---|
| 2009/0073134 A1 | 3/2009 | Huang et al. | |
| 2009/0300139 A1* | 12/2009 | Shoemaker et al. | 709/217 |
| 2010/0017710 A1* | 1/2010 | Kim et al. | 715/702 |
| 2010/0088632 A1* | 4/2010 | Knowles et al. | 715/784 |
| 2010/0222110 A1* | 9/2010 | Kim et al. | 455/566 |
| 2011/0050599 A1* | 3/2011 | Sip | 345/173 |

FOREIGN PATENT DOCUMENTS

| | | |
|---|---|---|
| CN | 101594431 | 12/2009 |
| JP | 2009-163363 | 7/2009 |
| KR | 10-2005-091246 | 9/2005 |
| KR | 10-2007-0093723 | 9/2007 |
| KR | 10-0838017 | 6/2008 |

\* cited by examiner

*Primary Examiner* — Kent Chang
*Assistant Examiner* — Nathan Brittingham
(74) *Attorney, Agent, or Firm* — H.C. Park & Associates, PLC

(57) ABSTRACT

A multi-display device includes: a transparent first touch panel; a second touch panel of which at least a part overlaps the first touch panel; and an operation controller which operates the first and second touch panels. The operation controller senses a touch input of the first and second touch panels to determine and execute a function according to a state of the sensed touch input and an overlapped state of the first and second touch panels. The operation controller may selectively activate first and second functions of first and second touch panels, respectively, according to a touch recognition result and select and execute a third function linked with the first and second functions.

20 Claims, 12 Drawing Sheets

(a)          (b)          (c)

(a)　　　(b)　　　(c)

(a)            (b)            (c)

MULTI-DISPLAY DEVICE AND METHOD FOR CONTROLLING THE SAME

CROSS-REFERENCE TO RELATED APPLICATION

This application claims priority from and the benefit under 35 U.S.C. §119(a) of Korean Patent Application No. 10-2010-0008671, filed on Jan. 29, 2010, the disclosure of which is incorporated herein by reference for all purposes.

BACKGROUND

1. Field

This disclosure relates to a multi-display device and a method for controlling the same.

2. Discussion of the Background

Recently, with technical development and expansion of the display market, various types of display devices and user interface techniques that allow users to use the display devices more conveniently have been introduced.

Various techniques using transparent displays, flexible displays, and the like have been introduced.

In the above-mentioned display techniques, the transparent display is implemented by transparent elements in a liquid crystal display (LCD), an active-matrix organic light-emitting diode (AMOLED), and the like to increase functionality. The technique is expected to have a wide range of applications and high potential market values.

However, in many cases, the touch panel or the transparent display device has a complicated user interface structure in which a user has to perform various operations to control an object displayed on a screen thereof.

SUMMARY

Exemplary embodiments of the present invention provide a multi-display device including transparent touch panels, and a method for controlling the same.

Exemplary embodiments of the present invention provide a method for implementing a user interface technique that may be applied to a multi-display device including transparent touch panels to enhance user convenience and extend applicable temporal/spatial functions.

Additional features of the invention will be set forth in the description which follows, and in part will be apparent from the description, or may be learned by practice of the invention.

An exemplary embodiment provides a multi-display device including: a transparent first touch panel; a second touch panel of which at least a part overlaps the first touch panel; and an operation controller to operate the first and second touch panels, to sense a touch input that occurs on one or more of the first and second touch panels, to determine and to execute a function corresponding to a state of the sensed touch input and an overlapped state of the first and second touch panels, and display screens on the first and second touch panels according to the determination result.

An exemplary embodiment provides a control method for a multi-display device including a transparent first touch panel and a second touch panel are capable of being overlapped with the first touch panel, the control method including: executing first and second applications of the respective first and second touch panels; sensing a touch input that occurs on one of the first and second touch panels; determining and executing a function corresponding to a state of the sensed touch input and an overlapped state of the first and second touch panels; and displaying screens of the first and second touch panels according to the execution result.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
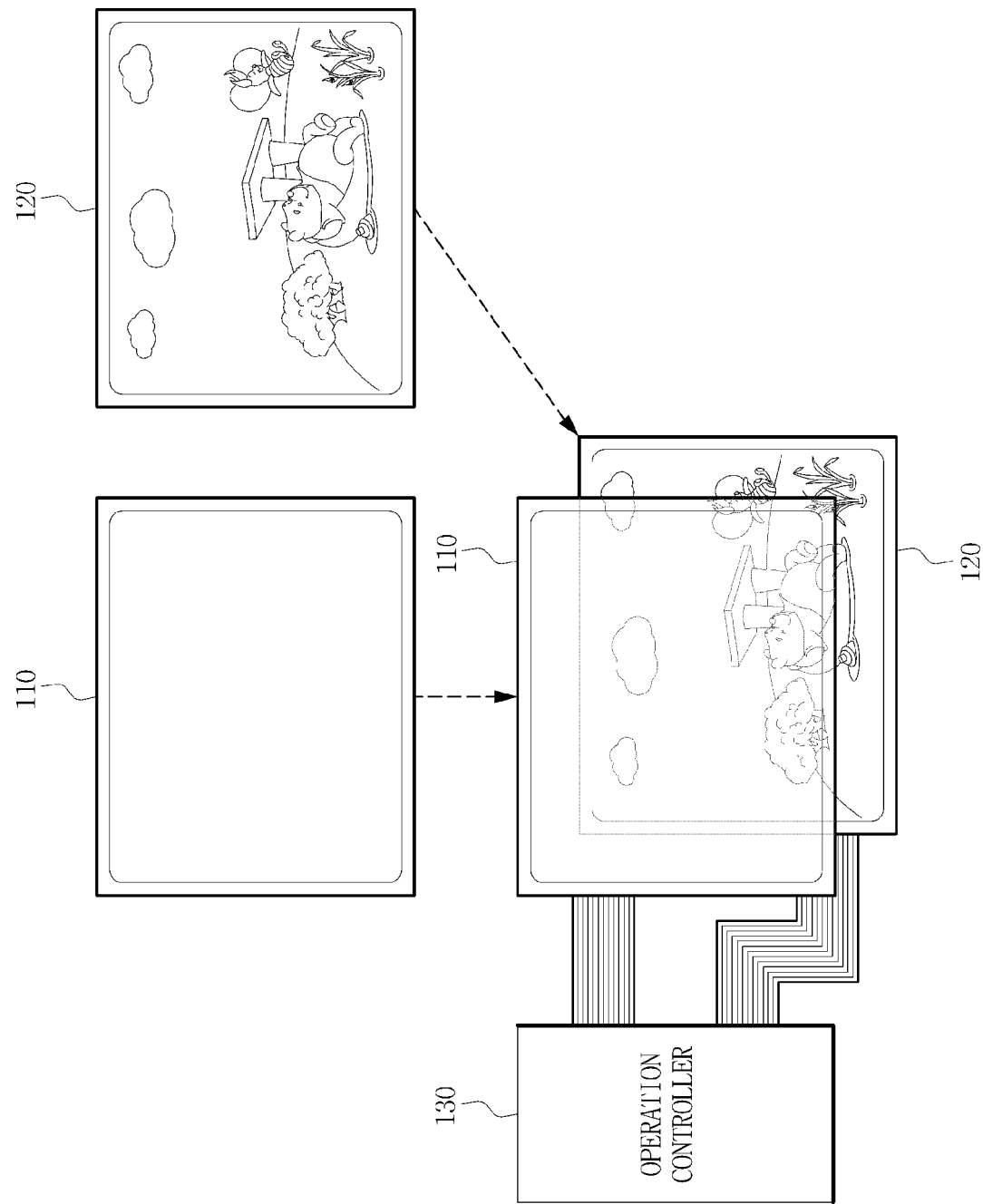
FIG. 1 illustrates a configuration of a multi-display device according to an exemplary embodiment.

Exemplary embodiments now will be described more fully hereinafter with reference to the accompanying drawings, in which exemplary embodiments are shown. This invention may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms 'a', 'an', etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size, and regions, and the like, of the drawings may be exaggerated for clarity.

FIG. 1 illustrates a configuration of a multi-display device according to an exemplary embodiment. Referring to FIG. 1, a multi-display device includes a first touch panel 110, a second touch panel 120, and an operation controller 130. Although described herein as a multi-display device, aspects may be applied to individual display devices communicating via a wired or a wireless connection, i.e., each of the first and second touch panels 110 and 120 may be in separate devices and may be controlled by the operation controller 130 or by an additional operation controller.

The first and second touch panels 110 and 120 are display panels which use a touch input from a user as an input pointer and may provide various functions on a screen through user interfaces of various kinds of applications.

The user interfaces of the first and second touch panels 110 and 120 display objects, such as programs, files, and operation options. The displayed objects include windows, fields, dialog boxes, menus, icons, buttons, cursors, scroll bars, and the like. The user may select a corresponding object and activate various functions related to the selected object. For example, the user may select a button to open, close, minimize, or maximize a window or select an icon to start a particular program. A movement of the input pointer on the first and second touch panels 110 and 120 corresponds to a relative movement of a finger of the user or a touch pen of the user. The user may use the finger or the touch pen to select an object of the first and second touch panels 110 and 120.

The first touch panel 110 disposed at an upper side of the second touch panel 120 may be transparent and may include a transparent thin-film transistor (TFT) or a transparent active-matrix organic light-emitting diode (AMOLED). A part of or the entirety of the second touch panel 120 disposed at a lower side of the first touch panel 110 overlaps with the first touch panel 110 to provide screens in an overlapped state. The second touch panel 120 may be configured to be transparent similar to the first touch panel 110.

The operation controller 130 operates the first and second touch panels 110 and 120 and senses a touch input on each of the first and second touch panels 110 and 120. In addition, the operation controller 130 determines and executes a function according to the touch input sensed by the first and second touch panels 110 and 120, and an overlapped state of the first and second touch panels 110 and 120. The operation controller 130 may determine and execute the function according to a type of touch or a touch point of the sensed touch input. The operation controller 130 changes a displayed state of screens of the first and second touch panels 110 and 120 according to the execution result. Moreover, the operation controller 130 determines how to select and execute functions of the first and second touch panels 110 and 120 in the overlapped state, and displays objects of the screens by controlling contents of the screens of the overlapped touch panels 110 and 120.

Figure 2:
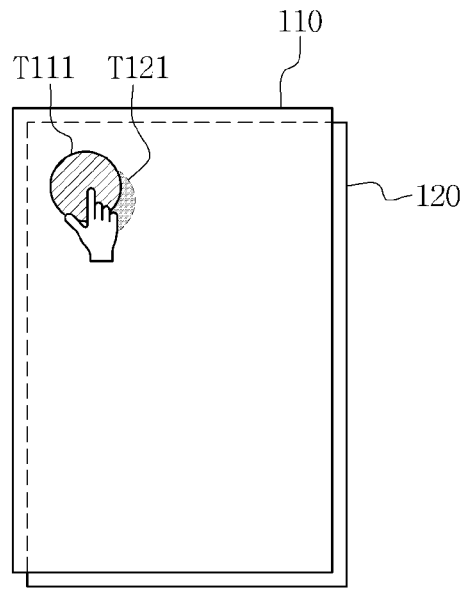
FIG. 2 illustrates a touch recognition method performed on screens of the multi-display device shown in FIG. 1.

FIG. 2 illustrates a touch recognition method performed on the screens of the multi-display device shown in FIG. 1 and illustrates the touch recognition method performed at a part in which the screens of the first and second touch panels 110 and 120 overlap. In FIG. 2, the first touch panel 110 is disposed in front of the second touch panel 120, but aspects are not limited thereto.

The above-mentioned operation controller 130 executes first and second applications of the first and second touch panels 110 and 120, respectively, and if a touch input occurs in an area in which the first and second touch panels 110 and 120 overlap, executes a function corresponding to a touch point of the first and second touch panels 110 and 120. A first function of a first application executed by the first touch panel 110 or a second function of a second application executed by the second touch panel 120 may be selectively activated.

The operation controller 130 performs processing of coordinate values of objects T111 and T121 on application screens of the first and second applications executed by the first and second touch panels 110 and 120. The operation controller 130 recognizes each of the first and second touch panels 110 and 120 and recognizes the coordinate values of the objects T111 and T121 displayed on the first and second touch panels 110 and 120, respectively. The operation controller 130 may recognize one of the first and second touch panels 110 and 120 on which the touch input occurs, i.e., which one of the first and second touch panels 110 and 120 is touched, coordinate values of an object at the touch point, whether the first and second touch panels 110 and 120 overlap, an overlapped state, and the like.

If the first and second touch panels 110 and 120 overlap at a same position with a same shape (i.e. overlapped physically at the same position or are completely overlapped), the operation controller 130 physically recognizes a part at which the touch occurs on the first touch panel 110 and shares coordinates of the corresponding touch point with the second touch panel 120 on the lower side of the first touch panel 110. The coordinates of the corresponding touch point may be absolute coordinates. Therefore, the operation controller 130 may selectively activate and execute the first object T111 of the first touch panel 110 at the touch point and the second object T121 of the second touch panel 120.

Figure 3:
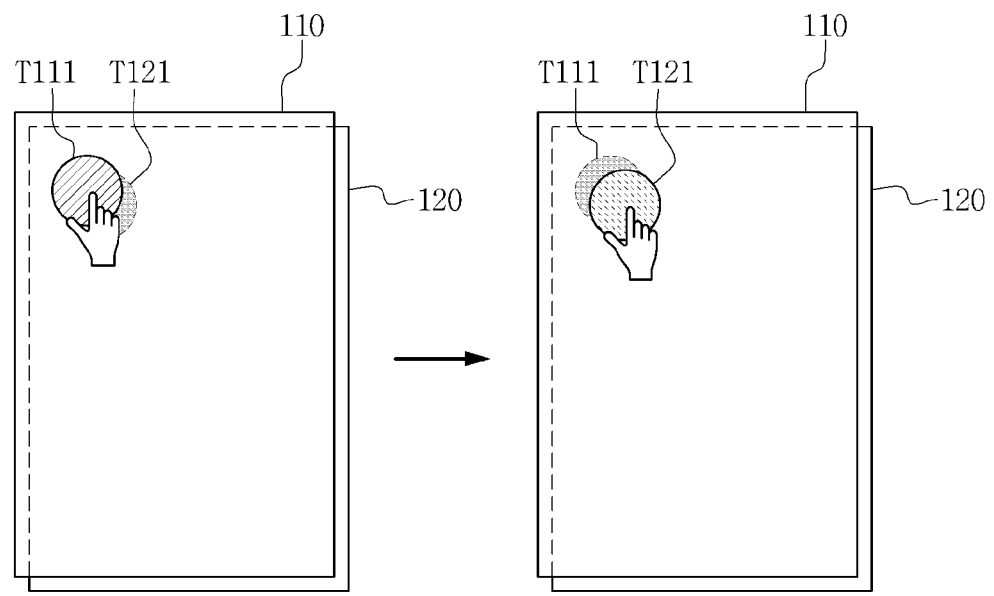
FIG. 3, FIG. 4, and FIG. 5 illustrate a touch recognition method of an overlapped part on the screens of the multi-display device shown in FIG. 1.
Figure 4:
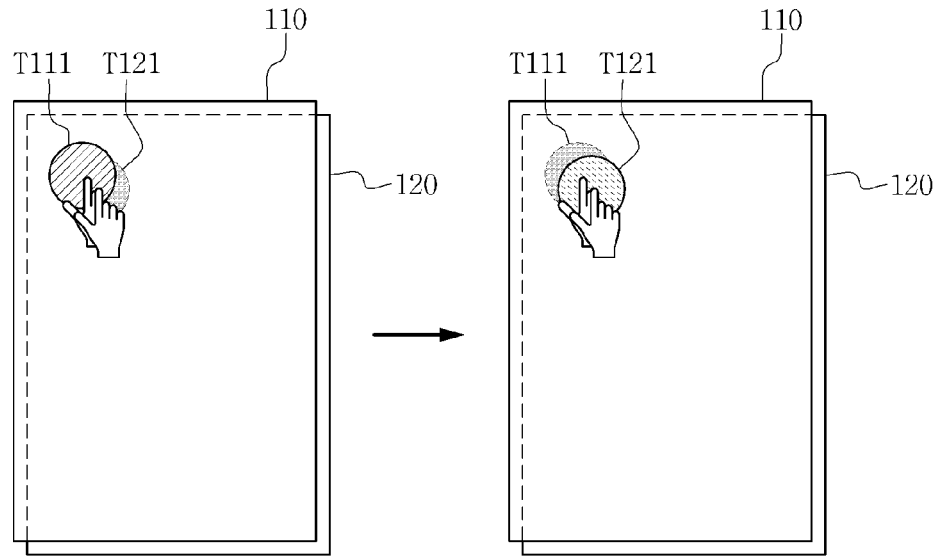
Figure 5:
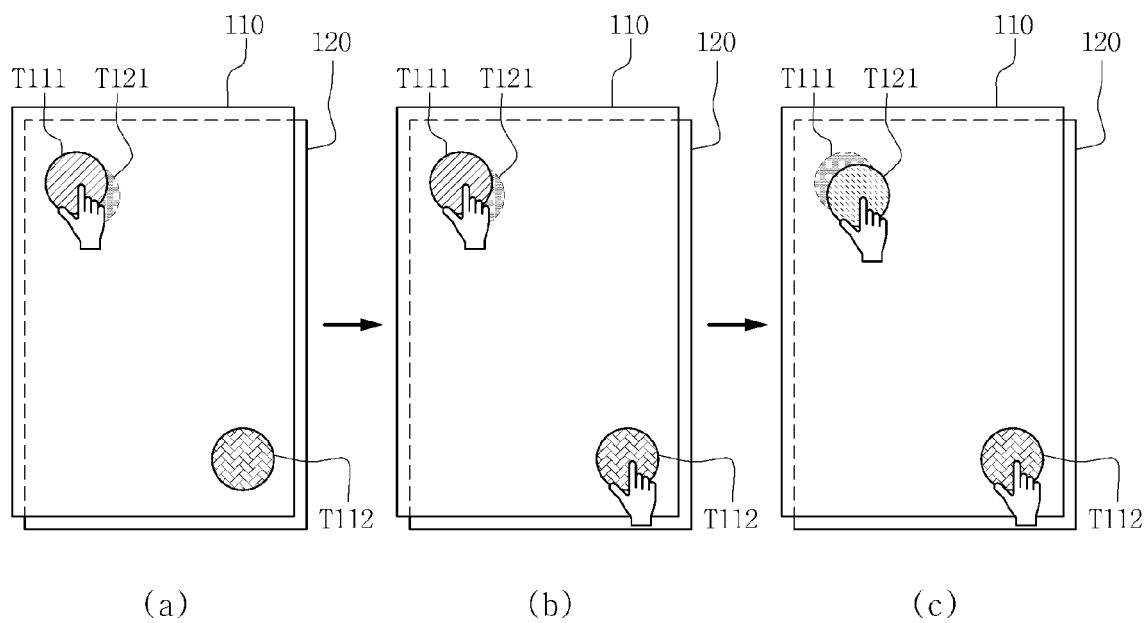

FIG. 3, FIG. 4, and FIG. 5 illustrate a touch recognition method of an overlapped part of the first and second touch panels 110 and 120 of the multi-display device shown in FIG. 1. In FIG. 3, FIG. 4, and FIG. 5, the first object T111 is an object that executes a first function in a first application screen executed by the first touch panel 110. The second object T121 is an object that executes a second function in a second application screen executed by the second touch panel 120.

FIG. 3 illustrates a method for identifying which one of the first and second objects T111 and T121 is selected according to a touch time. In FIG. 3, the first touch panel 110 is disposed in front of the second touch panel 120, but aspects are not limited thereto. If the first and second touch panels 110 and 120 are not overlapped with each other, the first and second objects T111 and T121 on the first and second application screens are individually executed by a direct touch operation. If the first and second touch panels 110 and 120 are overlapped, it is determined which one of the first and second objects T111 and T121 of the first and second application screens is selected according to a touch time. If a touch input occurs on the first touch panel 110 and is maintained for a time less than a reference time, the operation controller 130 selects and activates the first object T111, and if the touch input is maintained for a time greater than or equal to the reference time, the operation controller 130 selects and activates the second object T121.

For example, if the user physically touches the first object T111 for a time less than 100 ms, the operation controller 130 recognizes the corresponding touch as a selection of the first object T111 and maintains a focus of the first and second touch panels 110 and 120 on the first object T111. If the touch of the first object T111 is maintained for a time of 100 ms or longer, the operation controller 130 recognizes the corresponding touch input as a selection of the second object T121 and moves the focus the first and second touch panels 110 and 120 to the second object T121 as shown in FIG. 3.

FIG. 4 illustrates a method for identifying which one of the first and second objects T111 and T121 is selected according to a number of touches. In FIG. 4, the first touch panel 110 is disposed in front of the second touch panel 120, but aspects are not limited thereto. If the user touches the first object T111 on the first touch panel 110, the operation controller 130 selects and activates the first object T111 of the first touch panel 110 according to a first touch. If the user touches the first object T111 on the first touch panel 110 a second time, the operation controller 130 selects and activates the second object T121 by switching on the second object T121 on the second touch panel 120 according to a second touch. A focus the first and second touch panels 110 and 120 is on the first object T111 at a time of the first touch, and the focus the first and second touch panels 110 and 120 is switched to the second object T121 at a time of the second touch.

FIG. 5 illustrates a method for identifying which one of the first and second objects T111 and T121 is selected according to a multi-touch method. In FIG. 5, the first touch panel 110 is disposed in front of the second touch panel 120, but aspects are not limited thereto.

If the user touches the first object T111 on the first touch panel 110, the operation controller 130 selects and activates the first object T111 in response to a first touch. If the user touches a menu switch spot T112 positioned at another area by performing a multi-touch while touching the first object T111, the operation controller 130 recognizes that the corresponding touch is a touch to switch the activated object and selects and activates the second object T121.

At the time of the first touch, the operation controller 130 focuses on the first object T111 as shown in FIG. 5(a). If the user selects a particular portion with a second touch, for example, at an area that is not previously selected or a portion in which the menu switch spot T112 is positioned, by performing a multi-touch as shown in FIG. 5(b) while the first object T111 is touched, the focus is moved to the second object T121, as shown in FIG. 5(c). Thereafter, if the user removes the second touch of the multi-touch while the focus is on the first or second object T111 or T121, the selection of the corresponding object may be recognized. In FIG. 5(c), the second touch of the multi-touch is removed by detaching the finger of the user or the touch pen from the menu switch spot T112, thereby completing the selection of the second object T121.

Figure 6:
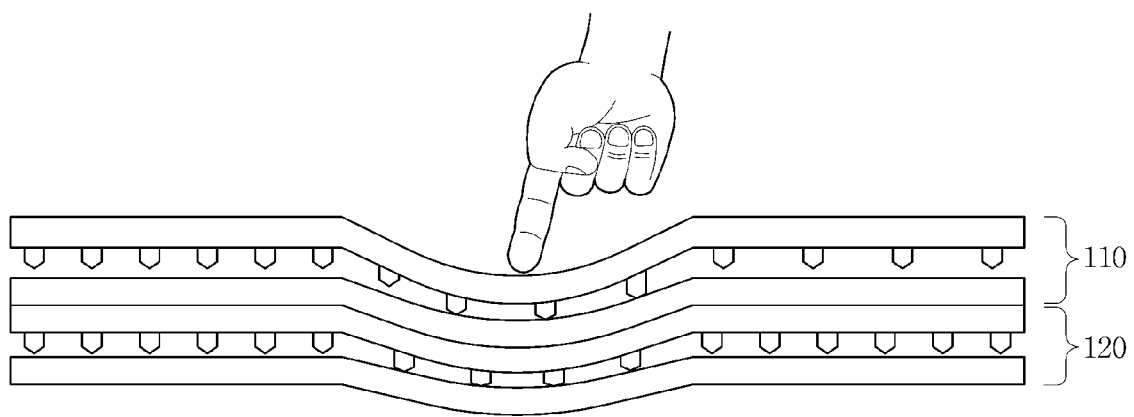
FIG. 6 illustrates a resistive overlay method for recognizing a touch of an overlapped portion according to a touch pressure.

FIG. 6 illustrates a resistive overlay method for recognizing a touch of an overlapped portion of the first and second touch panels 110 and 120 according to a touch pressure. In FIG. 6, the first touch panel 110 is disposed in front of the second touch panel 120, but aspects are not limited thereto.

As a touch recognition method performed at a portion in which screens are overlapped, capacitive overlay, resistive overlay, surface acoustic wave, infrared beam, electromagnetic induction, and the like may be used.

If a touch occurs on the first touch panel 110, and if the touch pressure of the touch is smaller than a reference value, the operation controller 130 selects and activates a first object at a touch point of the touch on the screen of the first touch panel 130, and if the touch pressure is greater than the reference value, the operation controller 130 selects and activates the second object of the second touch panel 120 overlapped with the first object of the first touch panel 130.

The operation controller 130 determines which one of the first and second touch panels 110 and 120 is touched and coordinate values of an object at the touch point. Even if the first and second touch panels 110 and 120 do not completely overlap, the operation controller 130 can physically recognize a portion to which pressure is applied to the first and second touch panels 110 and 120. Therefore, if absolute coordinates of the portion at which the pressure is applied on the first and second touch panels 110 and 120 are different from each other, the operation controller 130 can recognize the overlapped state of the objects displayed on the first and second touch panels 110 and 120.

Figure 7:
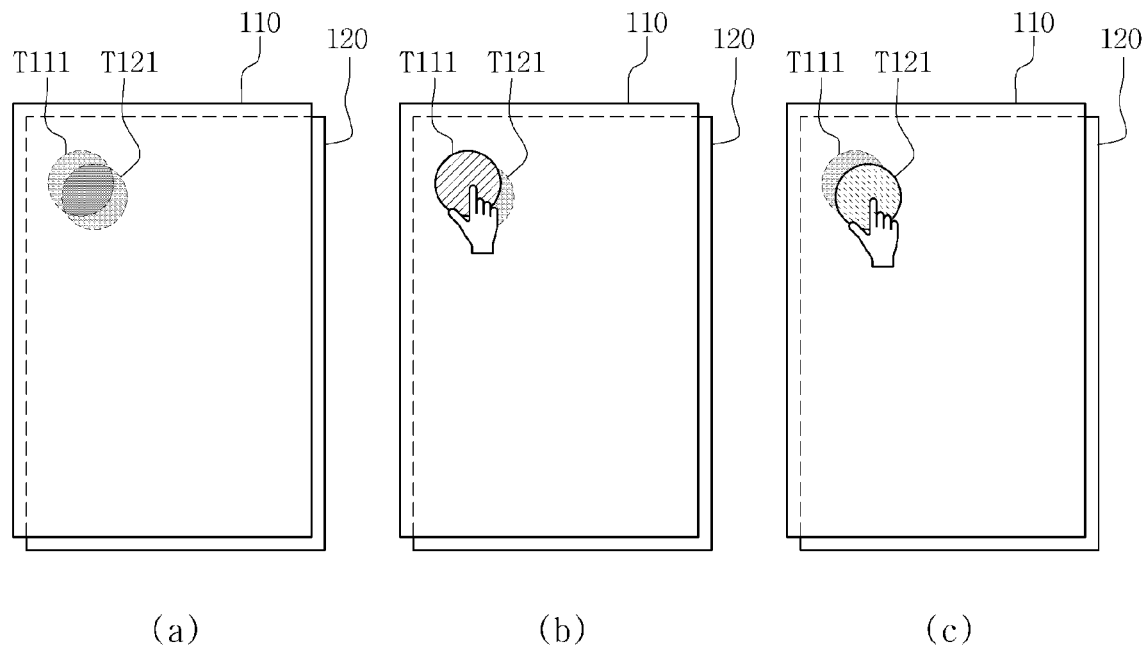
FIG. 7, FIG. 8, and FIG. 9 illustrate a method for activating and displaying objects selected on screens of the multi-display device shown in FIG. 1.
Figure 8:
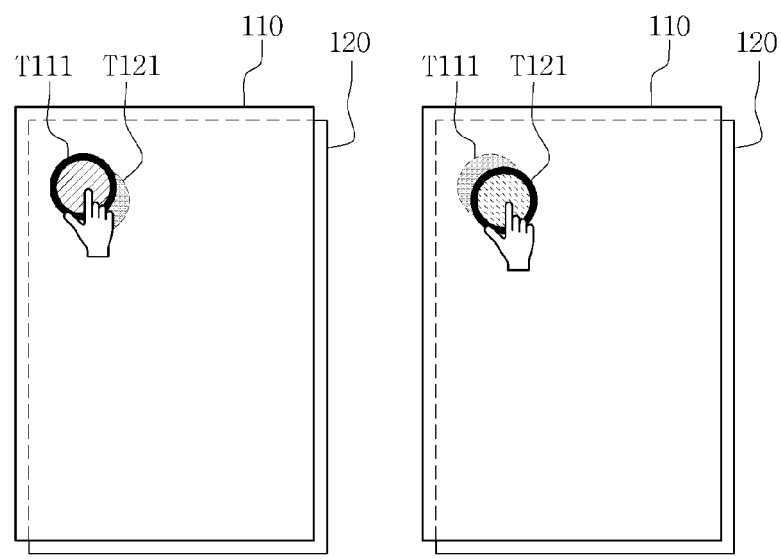
Figure 9:
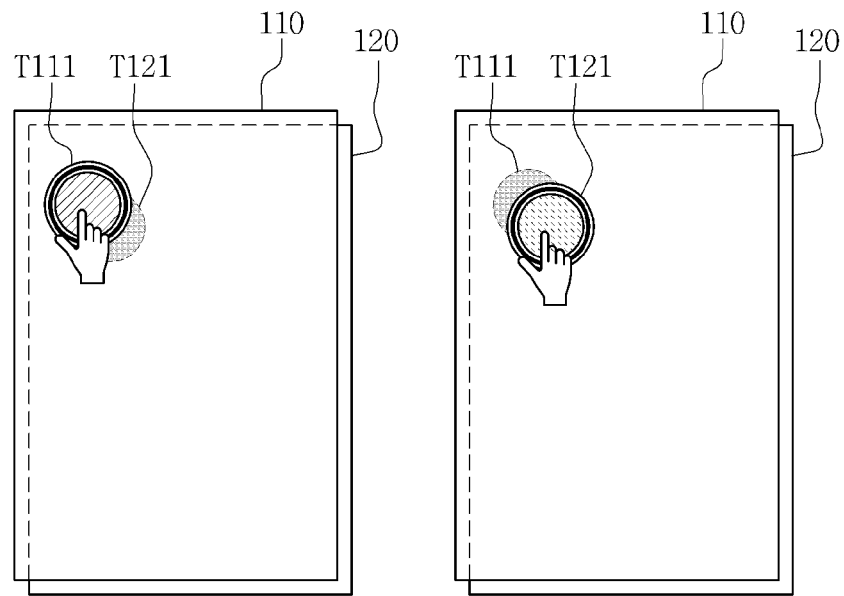

FIG. 7, FIG. 8, and FIG. 9 illustrate a method for activating and displaying objects selected on screens of the multi-display device shown in FIG. 1 and illustrate a method for displaying an object on each of the first and second touch panels 110 and 120 if the first touch panel 110, which is a transparent display, and the second touch panel 120 are overlapped with each other.

FIG. 7 illustrates a display method according to transparency of the first and second objects T111 and T121 displayed on the first and second touch panels 110 and 120. In FIG. 7, the first touch panel 110 is disposed in front of the second touch panel 120, but aspects are not limited thereto. The first and second objects T111 and T121 are both translucent in an initial state, as shown in FIG. 7(a). If the first object T111 is selected, the operation controller 130 decreases a transparency of the selected first object T111 as shown in FIG. 7(b). In this state, if the second object T121 is selected, the operation controller 130 returns the first object T111 to the prior transparency as shown in FIG. 7(c) and decreases a transparency of the second object T121.

FIG. 8 illustrates a display method according to object colors. In FIG. 8, the first touch panel 110 is disposed in front of the second touch panel 120, but aspects are not limited thereto. In an initial state in which neither of the first and second objects T111 and T121 is selected, the objects T111 and T121 are displayed with original colors, which may include translucent colors. If the first object T111 is selected, the operation controller 130 changes a border color, a foreground color, and/or a background color of the first object T111 to different colors having high visibility. In this state, if the second object T121 is selected, the operation controller 130 returns the first object T111 to the original color and changes colors of the selected second object T121.

FIG. 9 is a display method according to an object link effect. In FIG. 9, the first touch panel 110 is disposed in front of the second touch panel 120, but aspects are not limited thereto. In an initial state in which neither of the first and second objects T111 and T121 is selected, each of the objects T111 and T121 is set to have a specific size. If the first object T111 is selected, the size of the selected first object T111 is changed, and a link effect (for example, an animation effect) is displayed. If the second object T121 is selected in this state, the operation controller 130 stops the link effect of the first object T111, and the first object T111 is returned to its original size. In addition, the size of the second object T121 is changed and a link effect of the second object T121 is displayed.

As described above, the operation controller 130 changes the transparency, the color, the size, the link effect, or the like of the first and second objects T111 and T121 in the overlapped state of the first and second touch panels 110 and 120 of the multi-display device in an area in which the first and second touch panels 110 and 120 overlap to display a function activated by a touch input.

Figure 10:
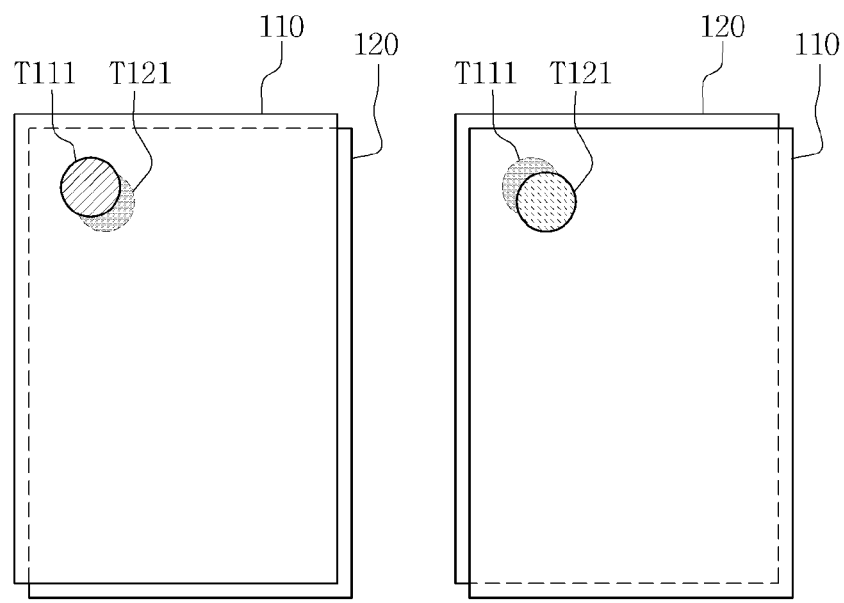
FIG. 10 and FIG. 11 illustrate an object movement method on screens of the multi-display device shown in FIG. 1.
Figure 11:
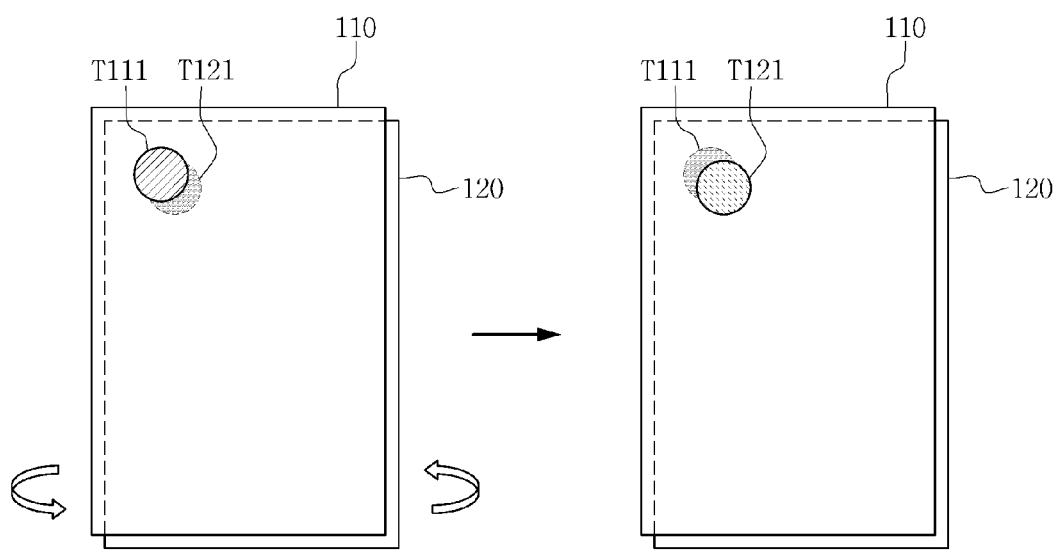

FIG. 10 and FIG. 11 illustrate an object movement method between the first and second touch panels 110 and 120 of the multi-display device shown in FIG. 1. A method of moving objects between the first and second touch panels 110 and 120 while displaying of the objects on the first touch panel 110 and the second touch panel 120 if the first touch panel 110, which is a transparent display, and the second touch panel 120 overlap is described.

FIG. 10 illustrates displaying a physical movement of the objects between the first and second touch panels 110 and 120 while the first and second touch panels 110 and 120 overlap. In FIG. 10, the first touch panel 110 is disposed in front of the second touch panel 120, but aspects are not limited thereto. In the physical screen configuration of the first and second touch panels 110 and 120, the first object T111 is displayed on a first application screen of the first touch panel 110, and the second object T121 is displayed on a second application screen of the second touch panel 120. If a user selection function performed by a touch input is switched from the first object T111 to the second object T121, the operation controller 130 moves the selected second object T121 and the second application screen including the second object T121 to the first touch panel 110 while maintaining the initial physical screen configuration of the first and second touch panels 110 and 120. That is, if the user selects the second object T121 displayed on the second application screen of the second touch panel 120 disposed on the lower side of the first touch panel 110, the selected second object T121 and the entire second application screen displayed on the second touch panel 120 are visually moved to the first touch panel 110 disposed on the upper side of the second touch panel 120.

FIG. 11 illustrates displaying a relative movement of the objects between the first and second touch panels 110 and 120 while the first and second touch panels 110 and 120 overlap. In FIG. 11, the first touch panel 110 is disposed in front of the second touch panel 120, but aspects are not limited thereto. If a user selection function is switched while the first and second touch panels 110 and 120 overlap, the operation controller 130 moves the first and second objects T111 and T121 between the screens of the first and second touch panels 110 and 120 while leaving the first application screen and the second application screen in the initial state. The first and second objects T111 and T121 are displayed while being switched to the other application screens of the first and second touch panels 110 and 120. For example, if the user selects the second object T121 on the second application screen of the second touch panel 120 disposed on the lower side of the first touch panel 110 while the first object T111 displayed on the first application screen of the first touch panel 110 on the upper side of the second touch panel 120 is selected, the operation controller 130 moves the second object T121 to the first application screen of the first touch panel 110. The positions of the first and second objects T111 and T121 are visually exchanged between the first and second touch panel 110 and 120. That is, the first object T111 is moved from the first application screen of the first touch panel 110 to the second application screen of the second touch panel 120, and the second object T121 is moved from the second application screen of the second touch panel 120 to the first application screen of the first touch panel 110 disposed on the upper side of the second touch panel 110.

As shown in FIG. 7, FIG. 8, FIG. 9, FIG. 10, and FIG. 11, functions selected by the user may be displayed in various manners, and visibility of the object selected on the screen may be enhanced by combining one or more methods.

Figure 12:
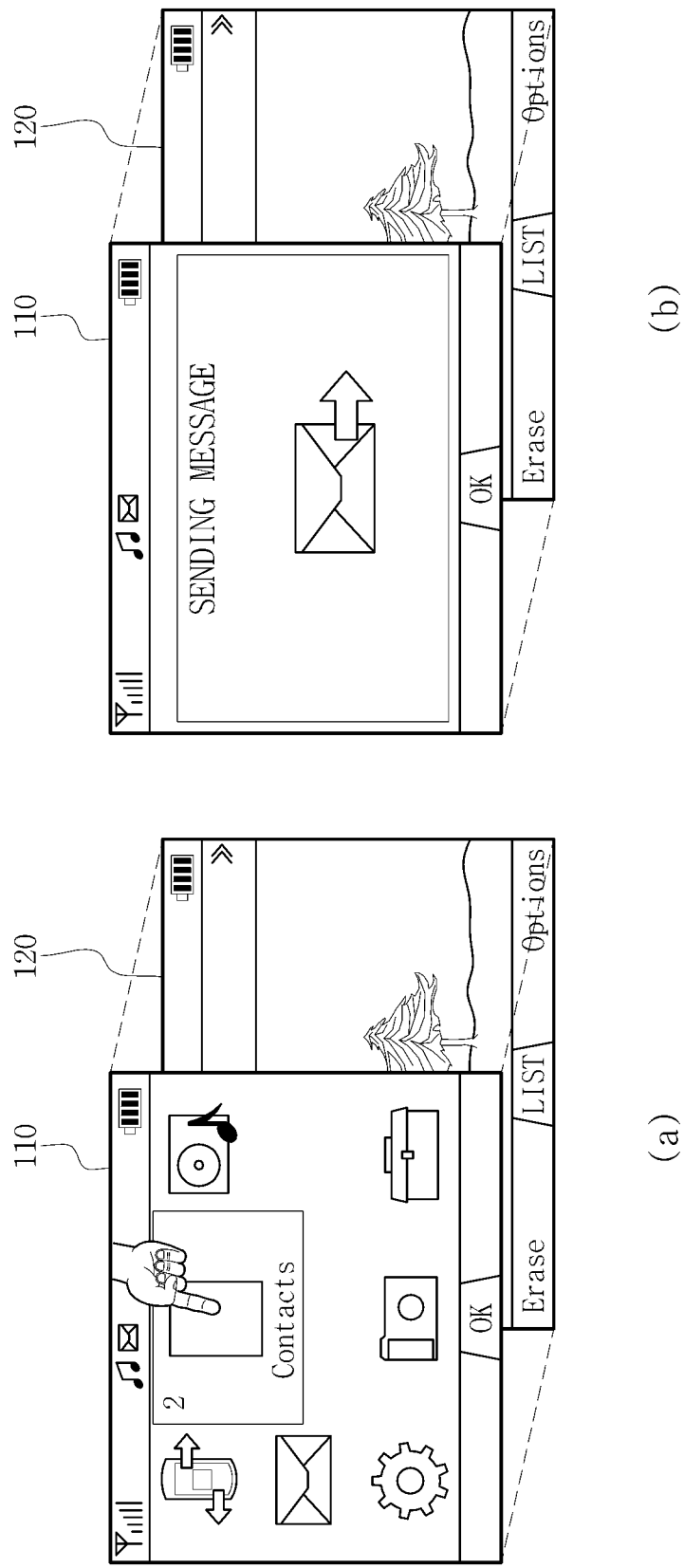
FIG. 12 illustrates a screen configuration of a multi-display device according to an exemplary embodiment.

FIG. 12 illustrates a screen configuration of a multi-display device according to an exemplary embodiment.

As described above, the operation controller 130 executes the first and second application screens on the first and second touch panels 110 and 120, respectively. If a touch input occurs in an area in which the first and second touch panels 110 and 120 overlap, a function corresponding to a touch point is executed.

As shown in FIG. 12, the operation controller 130 executes a third function linked with the first and second functions of the first and second applications executed by the first and second touch panels 110 and 120, respectively. If the first and second functions of the first and second applications executed by the first and second touch panels 110 and 120 which are in the overlapped state are selected, a third function linked therewith is executed.

The operation controller 130 registers an overlay execution command list by matching objects of the first application with objects of the second application. The operation controller 130 may identify the first and second objects positioned on a touch point in the overlapped state and recognize and execute an overlay execution command corresponding to the first and second objects from the overlay execution command list.

If the user touches at least one of the first and second touch panels 110 and 120, the third function linked with the corresponding screens is executed. For example, if a phone book icon of the first touch panel 110 overlaps with a picture of the second touch panel 120, as shown in FIG. 12(a), the user may touch the corresponding area to execute a Multimedia Messaging Service (MMS) function of sending the picture to a designated person, as shown in FIG. 12(b).

Table 1 shows a list of examples of executing a third function linked with the first and second functions of the first and second applications executed by the first and second touch panels 110 and 120, respectively, by a touch input.

TABLE 1

| First Application | Second Application | Third Application | Note |
|---|---|---|---|
| Call, Call History | Image Album | Send MMS | Determination of mapping to Send MMS or Caller ID Setting is made during registration. |
| | Video Album | Send MMS | |
| | Sound Album | Send MMS | |
| | Music Player | Send MMS | |
| | Image Album | Picture Caller ID Setting | |
| | Video Album | Video Caller ID Setting | |
| | Sound Album | Ringer Caller ID Setting | |
| | Music Player | Ringer Caller ID Setting | |
| Idle | Image Album | Idle Wallpaper Screen Setting | |
| | Video Album | Idle Wallpaper Screen Setting | |
| Contact List Or Detail View | Image Album | Send MMS | Determination of mapping to Send MMS or Caller Id Setting is made during registration. |
| | Video Album | Send MMS | |
| | Sound Album | Send MMS | |
| | Music Player | Send MMS | |
| | Image Album | Picture Caller ID Setting | |
| | Video Album | Video Caller ID Setting | |

TABLE 1-continued

| First Application | Second Application | Third Application | Note |
|---|---|---|---|
|  | Sound Album | Ringer Caller ID Setting |  |
|  | Music Player | Ringer Caller ID Setting |  |
| Alarm | Sound Album | Alarm Ringer Setting |  |
|  | Music Player | Alarm Ringer Setting |  |
| MMS | Image Album | Send MMS |  |
|  | Video Album | Send MMS |  |
|  | Sound Album | Send MMS |  |
|  | Music Player | Send MMS |  |
| SMS | Memo (Note Pad) | Send MMS |  |
| Navigator | Contact List or Detail View | Send GPS Info |  |
|  | MMS | Send GPS Info |  |
|  | Memo (Note Pad) | Send GPS Info |  |

If several objects are displayed on the first application screen of the first touch panel 110 and several objects are displayed on the second application screen of the second touch panel 120, third functions matched with coordinate values of touch points as shown in Table 1 may be executed.

For example, in Table 1, it may be assumed that the first application of the first touch panel 110 is a "Contact List" and the second application of the second touch panel 120 is an "Image Album". If a touch input occurs, the operation controller 130 executes "Send MMS" matched with the "Contact List" and the "Image Album" to select a picture in the "Image Album" to send an MMS to a contact of a contact list.

For another example, it may be assumed that the first touch panel 110 is in an "Idle" state and a "Video Album" is activated in the second touch panel 120. If an area corresponding to the "Video Album" is touched, the operation controller 130 may execute the third function for "Idle Wallpaper Screen Setting" to set a video stored in the "Video Album" on the wallpaper screen.

For another example, it may be assumed that a touch occurs in an area in which a "Call" icon of the first application and a "Music Player" icon of the second application. The operation controller 130 executes the third function for "Ringer Caller ID Setting" to provide a user interface for mapping and registering a particular sound source stored in the "Music Player" to a directory of a designated person.

Further, for example, the first application screen may be displayed on the entire screen of the first touch panel 110 and several objects of the second application may be displayed on the second touch panel 120 (or vise versa). In this case, at the time when the first and second touch panels 110 and 120 are overlapped, the operation controller 130 may activate only objects that are linked to the first application screen of the first touch panel 110 from among the several objects of the second touch panel 120 and execute the third function while selecting the activated objects. For example, if the user selects a "Calendar" from among the several objects of the second touch panel 120 in the state in which the first touch panel 110 displays a picture, the picture may be displayed as a background for a designated date in the calendar.

Further, the touch recognition methods described with reference to FIGS. 2 to 6 and the screen display methods described with reference to FIGS. 7 to 11 may be used. Above, the first and second functions may be selectively activated if a touch is input. In contrast, here, the new third function linked with the first and second functions is activated if a touch is input.

Figure 13:
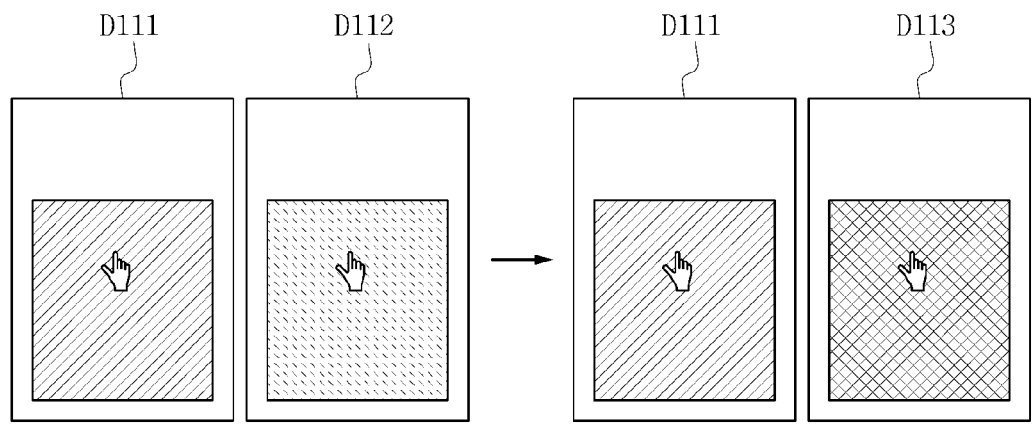
FIG. 13, FIG. 14, and FIG. 15 illustrate a method for executing a new third link function on screens of the multi-display device shown in FIG. 12.
Figure 14:
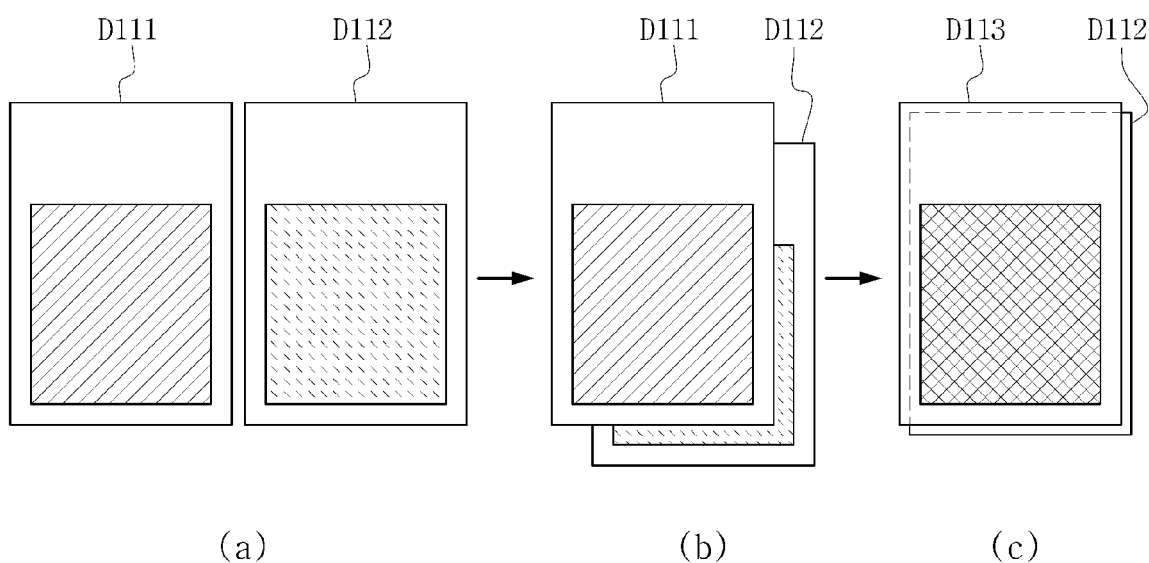
Figure 15:
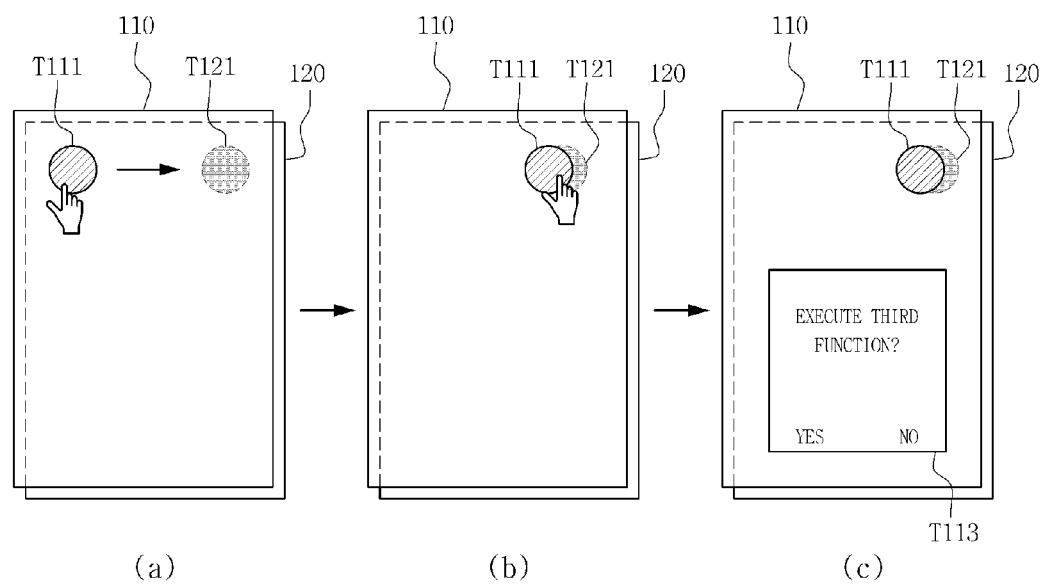

FIG. 13, FIG. 14, and FIG. 15 illustrate a method for executing a new third link function on the screens of the multi-display device shown in FIG. 12.

FIG. 13 illustrates a method for recognizing a third function according to a multi-touch if the first and second touch panels 110 and 120 do not overlap. The first touch panel 110 displays a first application screen D111, and the second touch panel 120 displays a second application screen D112.

If the user performs a multi-touch on a same or a different screen of first and second application screens D111 and D112 while the first touch panel 110 that is executing the first application and the second touch panel 120 that is executing the second application do not overlap, the operation controller 130 recognizes the multi-touch as a third function and executes a third application. If both the first and second touch panels 110 and 120 are touched while not being overlapped, a third application screen D113 is displayed on one of the first and second touch panels 110 and 120 by executing the third function.

FIG. 14 illustrates a method for recognizing a third function in response to an operation of overlapping the first and second touch panels 110 and 120.

In an initial state illustrated in FIG. 14(a) in which the first and second touch panels 110 and 120 are not overlapped, the first and second touch panels 110 and 120 respectively display the first and second application screens D111 and D112 which are different from each other. The first touch panel 110 that is executing the first application and the second touch panel 120 that is executing the second application are overlapped while being separated from each other and moved to an overlapped state as illustrated in FIG. 14(b). In this case, the operation controller 130 may execute a third function that combines functions of the first and second applications according to the overlapped state. FIG. 14(c) illustrates a state in which the third function is executed by the overlaying operation of the first and second touch panels 110 and 120 and the third application screen D113 is displayed.

Otherwise, after activating functions that can be linked to the first application from among the functions of the second application at the time when the first and second touch panels 110 and 120 are overlapped with each other, the third function may be executed if a touch input occurs. Here, if the user overlaps the first and second touch panels 110 and 120, the operation controller 130 may execute and display the third application linked with the first and second applications. Alternatively, the operation controller 130 may select and activate the third function linked with the first and second functions of the first and second applications that overlap so as to execute the third function.

FIG. 15 illustrates a method for recognizing a third function by applying objects in an overlapped state if the first and second touch panels 110 and 120 overlap. In FIG. 15, the first touch panel 110 is disposed in front of the second touch panel 120, but aspects are not limited thereto.

The operation controller 130 may execute a third function linked with overlaying objects according to a movement of an object representing a first or second function or an overlapped state of the object with another object while the first and second touch panels 110 and 120 overlap.

As illustrated in FIGS. 15(a) and 15(b), if the user touches and moves the first object T111 to an area at which the second object T121 is positioned so as to overlap the first object T111 with the second object T121 and then removes the touch, the operation controller 130 opens an interactive pop-up window T113 as illustrated in FIG. 15(c) to ask whether to execute the third function. Specifically, the interactive pop-up window T113 is opened to ask whether to execute the function of the first object T111 or to execute the third function linked with the first and second objects T111 and T121 so as to recognize a function desired by the user. The function of the first object T111 may be executed according to a focus of the display on the first object T111.

A touch method may use input data of various types, including touch time, a number of touches, addition and removal of a touch point due to a multi-touch, touch pressure, gravity, and acceleration.

In addition, a selection of the first, second, or third function may be recognized by identifying a type of a touch input using the input data. For example, in a case in which the first and second objects T111 and T121 overlap and the user touches the first object T111 for a predetermined time or longer (see FIG. 3) or performs a double-touch of the first object T111 (see FIG. 4) while the first object T111 is selected, the operation controller 130 may recognize the touch input as an operation for selecting the third function. Further, if a multi-touch occurs as illustrated in FIG. 5, this may be recognized as a selection of the third function instead of a selection of the second object T121 to execute the third function.

As described above, if objects (menus, icons, and the like) that can be controlled by the user are split and displayed on the first and second touch panels 110 and 120, the type of the touch input is identified to allow the first and second touch panels 110 and 120 to perform functions. In addition, if the first and second touch panels 110 and 120 overlap with each other, a function of the first touch panel 110 and a function of the second touch panel 120 may be combined to execute the third function.

Figure 16:
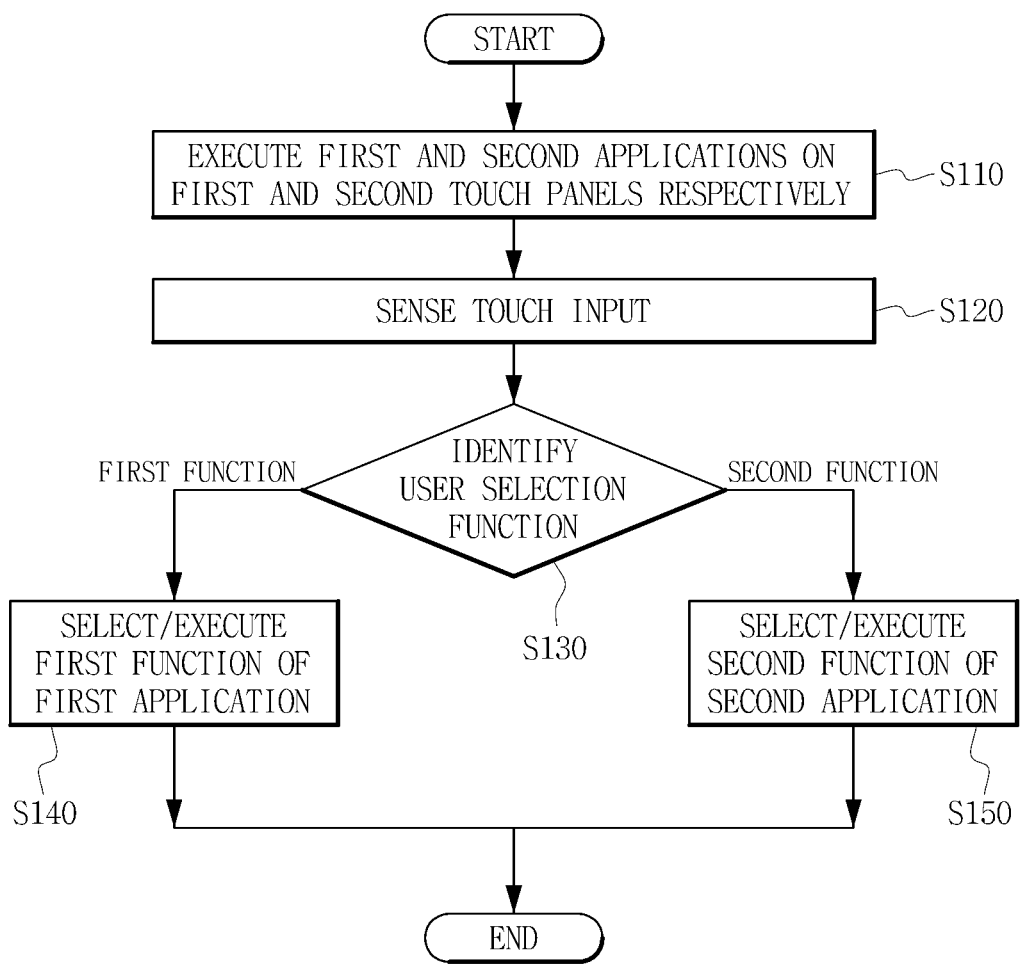
FIG. 16 is a flowchart of a control method of the multi-display device according an exemplary embodiment.

FIG. 16 is a flowchart of a control method of the multi-display device according to an exemplary embodiment.

The operation controller 130 executes and displays the first and second applications on the first and second touch panels 110 and 120 (S110). If a user touches a part of the first or second touch panel 110 or 120, the operation controller 130 senses a touch input (S120).

Thereafter, the operation controller 130 determines a function designated by a user according to a type of the touch input sensed by the first or second touch panel 110 or 120, a touch point, and an overlapped state of the first and second touch panels 110 and 120 (S130) to execute the function, and switches between the screens of the first and second touch panels 110 and 120 so as to be displayed according to the execution result (S140 and S150), i.e., the operation controller 130 displays application screens of the first and second touch panels 110 and 120 according to the determination as described above.

Here, the operation controller 130 may selectively activate or execute the first and second functions of the first and second applications executed by the first and second touch panels 110 and 120, respectively, according to the touch point of the screens if a touch input occurs in an area in which the first and second touch panels 110 and 120 overlap.

Figure 17:
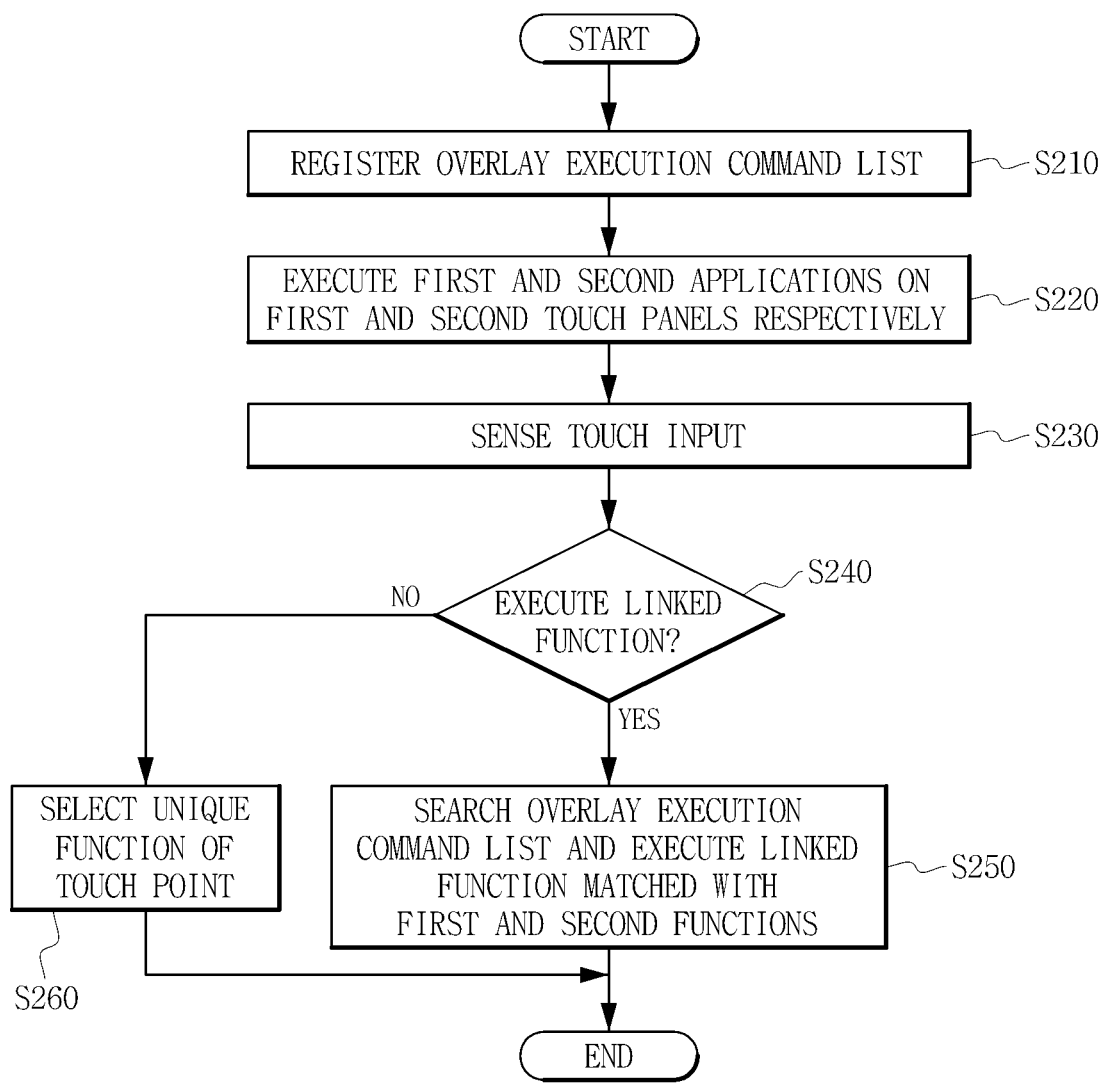
FIG. 17 is a flowchart of a control method of the multi-display device according an exemplary embodiment.

FIG. 17 is a flowchart of a control method of the multi-display device according to an exemplary embodiment.

First, the operation controller 130 matches the first function of the first application, the second function of the second application, and the third function linked with the first and second functions with each other and registers them as an overlay execution command list as shown in Table 1 (S210).

Thereafter, the operation controller 130 executes and displays the first and second applications on the respective touch panels 110 and 120 (S220). If a user touches a part of the first and second touch panels 110 and 120, the operation controller 130 senses a touch input (S230).

Thereafter, the operation controller 130 determines whether to execute the third function by determining the function according to a state (for example, a type of the touch input and/or a touch point) of the touch input sensed in the area in which the first and second touch panels 110 and 120 overlap, and the overlapped state of the first and second touch panels 110 and 120 (S240). The third function may be linked with the first function executed by the first touch panel 110 and the second function executed by the second touch panel 120 according to the touch point.

If the sensed touch input is recognized as the execution of the third function, the operation controller 130 recognizes the third function matched with the first and second functions that are being executed from the registered overlay execution command list (S250). If the selection of the user is recognized as one of the first and second functions instead of the third function, the first or second function according to the touch point at which the physical touch operation occurs is selected to be executed (S260).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-display device comprising:
a transparent first touch panel;
a second touch panel of which at least a part is capable of being overlapped with the first touch panel; and
an operation controller to operate the first and second touch panels, to sense a touch input that occurs on at least one of the first and second touch panels, to determine and to execute a linked function corresponding to the touch input and an overlapped state of the first and second touch panels, and to display the execution of the linked function on at least one of the first and second touch panels,
wherein, if the touch input occurs in an area in which the first and second touch panels overlap when the first touch panel and the second touch panel display a first application and a second application, respectively, the operation controller executes the linked function, the linked function being linked with a first function of the first application displayed on the first touch panel and a second function of the second application displayed on the second touch panel, and
wherein the operation controller registers an overlay execution command list by matching objects of the first application with objects of the second application, identifies first and second objects positioned at a touch point in the overlapped state, and recognizes and executes an overlay execution command matched with the first and second objects from the overlay execution command list.

2. The multi-display device of claim 1, wherein, if a first touch occurs in an area in which the first and second touch panels overlap, the operation controller selectively activates the first or second function according to a type of the first touch.

3. The multi-display device of claim 1, wherein, if a first touch occurs on the first touch panel, the operation controller activates the first function in response to the first touch and activates the second function in response to a second touch.

4. The multi-display device of claim 1, wherein, if a first touch occurs on the first touch panel, the operation controller activates the first function in response to the first touch, and if a second touch occurs while the first touch is maintained and the second touch is then removed, the operation controller activates the second function.

5. The multi-display device of claim 2, wherein, if the first touch occurs on the first touch panel, the operation controller activates the first function if a touch pressure of the first touch is smaller than a reference value, and the operation controller activates the second function if the touch pressure of the first touch is equal to or greater than the reference value.

6. The multi-display device of claim 2, wherein the operation controller displays an object representing a selected function by changing at least one of transparency, color, size, and link effect of the object representing the first and second functions in an area where the first and second touch panels overlap.

7. The multi-display device of claim 1, wherein the operation controller determines whether to execute the first or second function according to at least one of a touch time, a number of touches, addition and removal of a touch of a multi-touch, a touch pressure, gravity, and acceleration.

8. The multi-display device of claim 1, wherein the operation controller executes the linked function linked with overlapped objects according to a movement to overlap an object representing the first or second function with an object representing the other of the first and second functions.

9. The multi-display device of claim 1, wherein, if the first touch panel executing the first application and the second touch panel executing the second application are moved to an overlapped state from a non-overlapped state, the operation controller executes the linked function that combines at least a part of the first application and a part of the second application according to the overlapped state.

10. The multi-display device of claim 9, wherein, if the first and second touch panels overlap, after activating the second function of the second application that is capable of being linked to the linked function corresponding to the touch input and the overlapped state of the first and second touch panels from among functions of the second application, the operation controller executes the linked function corresponding to the touch input and the overlapped state of the first and second touch panels in response to the touch input.

11. The multi-display device of claim 9, wherein the operation controller executes the linked function corresponding to the touch input and the overlapped state of the first and second touch panels if both the first and second touch panels are touched while in the non-overlapped state.

12. A method for controlling a multi-display device comprising a transparent first touch panel and a second touch panel capable of being overlapped with the first touch panel, the method comprising:
    executing a first application of a first touch panel and a second application of a second touch panel;
    sensing a touch input that occurs on at least one of the first and second touch panels;
    determining a linked function corresponding to the touch input and an overlapped state of the first and second touch panels, the determining comprising identifying first and second objects positioned at a touch point in the overlapped state, wherein an overlay execution command list has been registered by matching objects of the first application with objects of the second application, and recognizing and executing an overlay execution command matched with the first and second objects from the overlay execution command list;
    executing the linked function; and
    displaying the execution of the linked function on at least one of the first and second touch panels,
    wherein, if the touch input occurs in an area where the first and second touch panels overlap when the first touch panel and the second touch panel display the first application and the second application, respectively, the linked function corresponds to a function linked with a first function of the first application displayed on the first touch panel and a second function of the second application displayed on the second touch panel.

13. The method of claim 12, wherein, in the determining, if a first touch occurs in an area in which the first and second touch panels overlap, the first and second functions are selectively activated according to a type of the first touch.

14. The method of claim 12, wherein, in the determining, if a first touch occurs in an area in which the first and second touch panels overlap, activating the first function of the first touch panel in response to the first touch and activating the second function of the second touch panel in response to a second touch occurring and being released while the first touch is maintained.

15. The method of claim 12, wherein, in the determining, if a first touch occurs in an area in which the first and second touch panels overlap, activating the first function of the first touch panel if a touch pressure of the first touch is smaller than a reference value and activating the second function of the second touch panel if the touch pressure of the first touch is greater than or equal to the reference value.

16. The method of claim 12, further comprising:
    changing at least one of transparency, color, size, and link effect of an object for executing the first and second functions of the first and second touch panels in an area where the first and second touch panels overlap in response to the determining.

17. A method for controlling a multi-display device comprising a transparent first touch panel and a second touch panel capable of being overlapped with the first touch panel, the method comprising:
    executing a first application of a first touch panel and a second application of a second touch panel;
    sensing a change of an overlapped state of the first and second touch panels, the sensing comprising identifying first and second objects positioned at a touch point in the overlapped state, wherein an overlay execution command list has been registered by matching objects of the first application with objects of the second application, and recognizing and executing an overlay execution command matched with the first and second objects from the overlay execution command list;
    executing a first linked function according to the sensed change of the overlapped state, the first linked function being configured to combine at least a part of the first application displayed on the first touch panel and a part of the second application displayed on the second touch panel; and
    displaying the execution of the first linked function on at least one of the first and second touch panels.

18. The method of claim 17, further comprising:
    sensing a touch input that occurs in an area where the first and second touch panels overlap; and
    executing a second linked function according to the touch input, the second linked function being linked with a first object of the first application and a second object of the second application.

19. A method for controlling a multi-display device comprising a transparent first touch panel and a second touch panel capable of being overlapped with the first touch panel, the method comprising:

executing a first application of a first touch panel and a second application of a second touch panel;

sensing a touch input that occurs on at least one of the first and second touch panels when the first touch panel and the second touch panel display the first application and the second application, respectively;

determining a first or second object corresponding to the sensed touch input and a partially overlapped state of the first and second touch panels, wherein, if the touch input occurs on a surface of the first touch panel and the touch input occurs in an area where the first and second touch panels partially overlap, the first object displayed on the first touch panel or the second object displayed on the second touch panel is determined according to the touch input, the second object being determined based on the touch input and the partially overlapped state of the first and second touch panels, and the second object being overlapped with the first object according to the partially overlapped state of the first and second touch panels;

determining a linked function corresponding to the touch input and an overlapped state of the first and second touch panels, the linked function being configured to combine at least a part of the first application displayed on the first touch panel and a part of the second application displayed on the second touch pane, the determining comprising identifying the first and second objects positioned at a touch point in the overlapped state, wherein an overlay execution command list has been registered by matching objects of the first application with objects of the second application, and recognizing and executing an overlay execution command matched with the first and second objects from the overlay execution command list; and displaying the execution of the linked function on at least one of the first and second touch panels.

20. The method of claim 19, further comprising:

recognizing a coordinate value of the second object corresponding to the touch input occurred on the surface of the first touch panel according to the determined overlapped state when the first and second touch panels partially overlap.

* * * * *